Feb. 16, 1943. H. CAMINEZ 2,311,329
SHRUNK CONNECTION, PARTICULARLY FOR TUBULAR MEMBERS
Filed Nov. 24, 1939 2 Sheets-Sheet 1
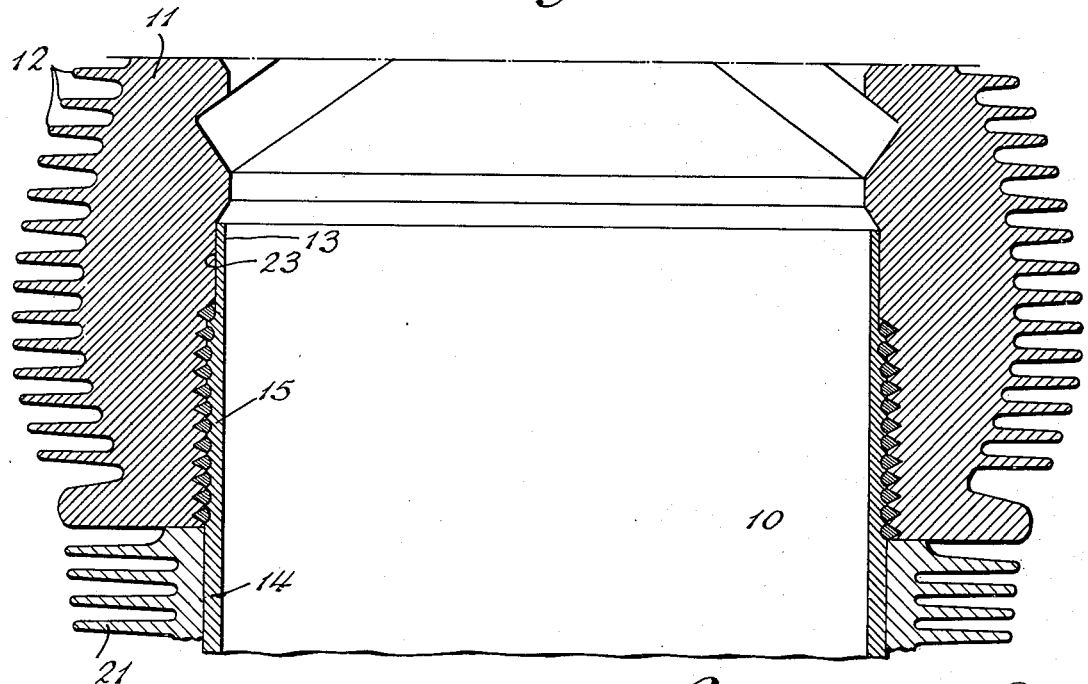
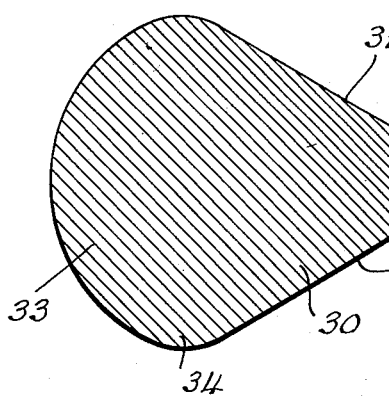
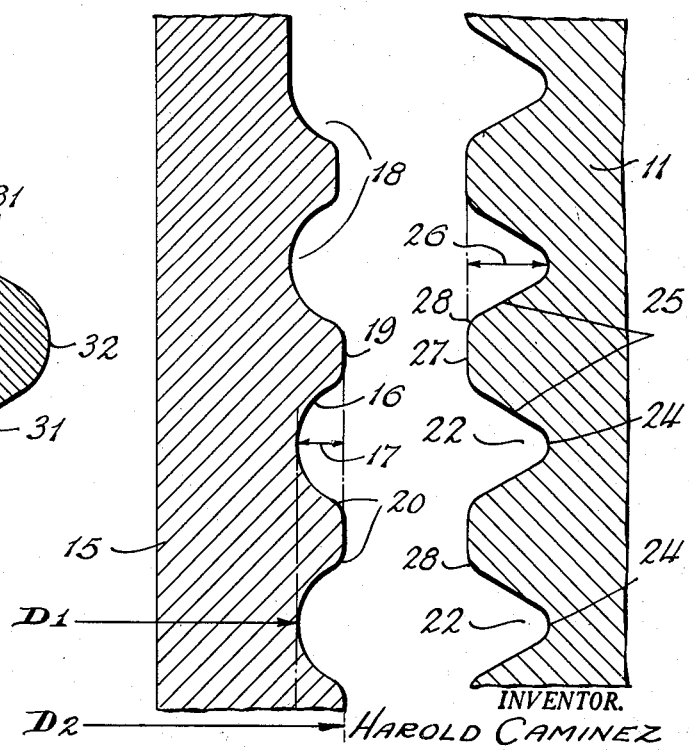
INVENTOR.
HAROLD CAMINEZ
BY Walter S. Bleston
ATTORNEY

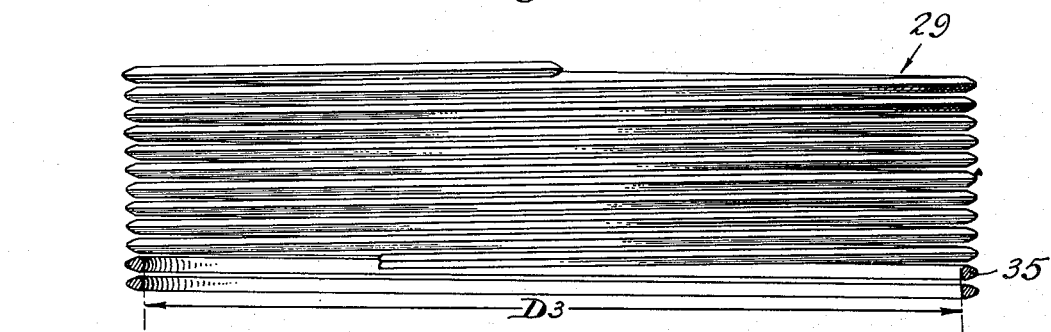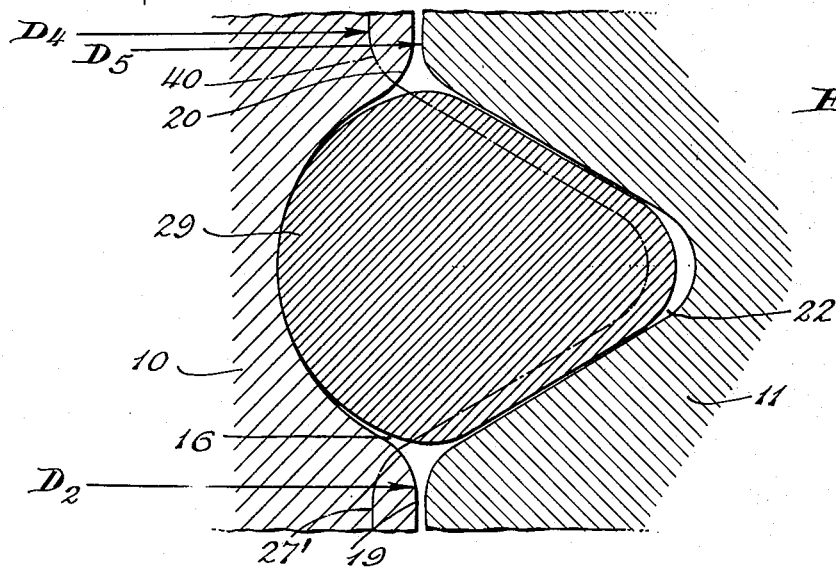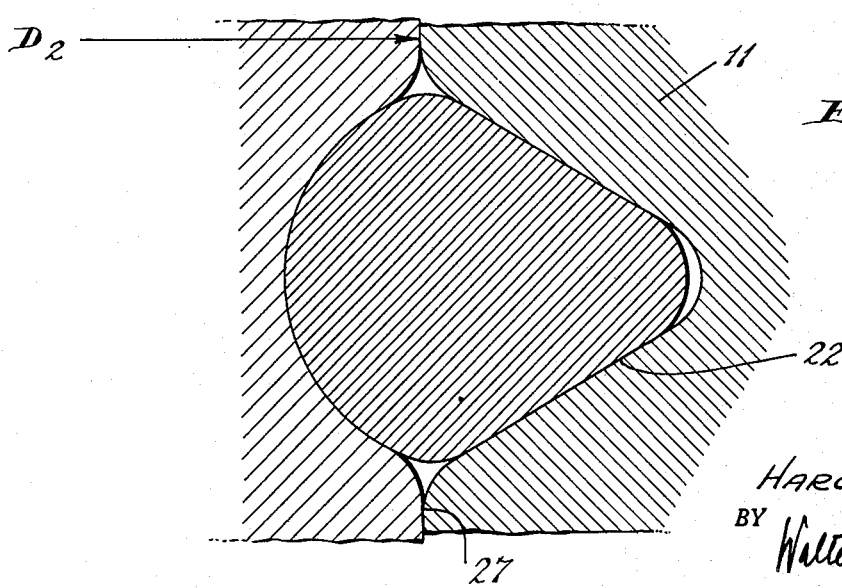

UNITED STATES PATENT OFFICE 2,311,329

SHRUNK CONNECTION, PARTICULARLY FOR TUBULAR MEMBERS

Harold Caminez, Kew Gardens, N. Y., assignor to Aircraft Screw Products Company, Inc., Long Island City, N. Y., a corporation of New York Application November 24, 1939, Serial No. 305,858

6 Claims. (Cl. 123—193)

The present invention relates to high strength screw connection particularly of tubular members in which the pitch diameter of the thread is a relatively very great multiple of the thread pitch or distance between successive thread convolutions. In my U. S. Patents Nos. 2,150,876 and 2,152,681 I have disclosed high strength screw connections in which a female screw member and a male screw member, particularly of the boss-and-bolt character are connected to each other by an intermediary piece or insert in the shape of a wire coil of a hard drawn bronze or other suitable material. The wire of the coil has a cross-section substantially composed of a slightly truncated triangle, preferably an equilateral triangle, on a rounded or segment-shaped base. The thread groove of the female member is V-shaped with sides converging at an angle equal to that of the afore-mentioned triangle, and the thread groove of the male member has a shallow segment-shaped form corresponding to the segment shape of the rounded portion of the wire. Particularly, in the case of tight fitting connections the thread groove of the male member is slightly wider than the rounded wire portion in order to ensure that the latter seats firmly on the bottom of the groove without exercising a wedging action against the groove sides whereas an outspoken wedging action is simultaneously exercised by the wire against both sides of the thread groove in the female member. Furthermore, the wire coil is originally wound with a diameter larger than the corresponding diameter of the thread groove in the female member, in order to obtain a wedging action owing to the springy quality of the wire inserted in the female member, even before the male member is screwed into the convolution of the wire coil inserted.

In applying the principle of a screw connection hereinbefore mentioned to members in which the pitch diameter is a relatively very large multiple of the pitch or distance between the thread convolution, certain difficulties are encountered. This is particularly so, if several or all of the following qualities are required, viz. resistance to high temperature, good thermal conductivity, light weight, small thickness of the walls in the case of tubular members, and if the two members to be connected consist of different material, e. g. the male member of a high strength steel and the female member of a light metal such as an aluminum or magnesium alloy, where the connection must have good anti-corrosive qualities in view of the electric potentials of the various metals, and anti-frictional properties to overcome the tendency to seize.

Although I have found that a connection of the type disclosed in my earlier patents is very well suited to fulfil the requirements of a connection here under consideration, a wire coil of fitting dimensions cannot readily be embedded in the thread groove of the female member prior to the insertion of the male member into the convolutions of the wire. A coil of thin wire wound with a relatively very large diameter is so flimsy and unstable in its form that it takes very slight pressure to displace it from the thread groove in the female member, and when attempting to screw a male member into the female member into which the coil is first inserted, it is practically impossible to keep the insert in place. If, however, the insert should move from place during the screwing operation, it will get jammed in the threads and definitely prevent assembling of the parts.

The present invention contemplates to make the principle disclosed in my afore-mentioned patents applicable to a screw connection of members of relatively large diameter and more particularly of tubular shape. The invention mainly consists in that the wire coil is originally wound undersized so as to be expanded when placed in the convolutions of the thread groove of the male member, the first convolution or only part of the first convolution of the thread groove of the male member being slightly deeper than its other convolutions, and the friction of that coil end which trails when the coil is screwed on the male member is increased, e. g. by bonding it to the bottom of said deeper groove convolution.

Inasmuch as a connection of the light metal head to the steel barrel of an aircooled engine such as used in airplanes is an example in which more or less all the afore-mentioned qualities are required, the invention will be hereinafter described as applied to such a machine part. However, I desire it to be understood that I do not limit myself to any particular structure or purpose, my invention being applicable in general within the scope of the appended claims.

Further objects and details will be apparent from the description hereinafter of an embodiment illustrated by the accompanying drawings in which Fig. 1 is a longitudinal section of a part of an engine cylinder illustrating the connection of head and barrel according to the invention;

Figs. 2 and 3 are sections of portions of the barrel and head, respectively, on an enlarged scale and showing the threads therein;

Fig. 4 is an elevation of the insert;

Fig. 5 is an enlarged cross-section of the coil wire; and

Figs. 6 and 7 are diagrammatic illustrations showing a portion of the connection before and after the assembling.

Referring now to the drawings, 10 is the steel barrel of an air-cooled internal combustion engine, to which barrel a cylinder head 11 is connected by the means of the invention. In the illustrated embodiment, the head 11 with cooling fins 12 is made of aluminum. However, as stated above, the invention is advantageously applicable also if the male and female members 10 and 11 are made of metals other than steel and aluminum, respectively. The barrel 10 has a top zone 13, a lower zone 14 and a threaded zone 15 intermediate the zones 13 and 14. The threaded zone 15, shown in detail in Fig. 2, has a thread groove 16, the cross-section of which is substantially a shallow segment of a circle. The height 17 of the segment or depth of the groove 16 is to be selected in consideration of the qualities of the materials used in the connection and of the stresses occurring therein. In the illustrated embodiment this height 17 is approximately 3/8 of the diameter of the segment. For reasons to be explained hereinafter, the topmost portion 18 of the thread groove, that is to say that portion which will be first engaged by the cylinder head when the latter is screwed home on the barrel, approximately over the length of one thread convolution, is made slightly deeper than the remainder of the groove for which the dimension 17 is valid. The individual convolutions of the thread groove are spaced by lands 19, the edges of which are rounded off on both sides at 20. The upper barrel portion 13 has an outer diameter preferably equal to the root diameter $D_1$ of the thread groove 16, and the lower portion 14 has an outer diameter preferably equal to the diameter $D_2$ of the lands 19. Cooling fins 21 of a material having good heat conducting qualities such as aluminum may be shrunk on the lower barrel portion 14. Now, it will be apparent that a threading such as described has very appreciable advantages over a threading hitherto in use in the connection of members, such as of a steel cylinder barrel to an aluminum head. The customary V-shaped thread groove is not only considerably deeper than the shallow groove according to the invention, but owing to the sharp corner of the converging flanks of the groove cross-section, there is the very serious danger of cracks or fissures occurring in service, the cracks spreading from such corner into the material of the barrel wall. Furthermore, in a V-thread of conventional type the sharp corners at the root of the thread conceal any such cracks, which makes it difficult, if not practically impossible, to detect such defects. Over these drawbacks, the screw system according to my invention offers the advantage that it permits thorough inspection of the cylinder barrel after the machining to be sure that no cylinders having unsatisfactory material are used, whereas, in service, the round bottom thread has practically eliminated the cracks that were previously experienced. In consequence thereof, the barrel wall can be made thinner than hitherto usual without reducing the safety offered by the removal of the cause for the formation of fissures. Furthermore, in connections of the type under consideration, the thermal conditions are of vital importance. In this respect the described barrel is helpful owing to the reduction of the wall thickness, because the heat imparted to the wall from the interior of the barrel will be transferred and dissipated to the outside, i. e. to the aluminum fins 21, the better the shorter the way through the steel material of the barrel wall which is a worse conductor of heat than the aluminum of the fins.

The cylinder head 11 is provided with an interior threading 22. The bore 23 on top of the threading is so shaped as to receive the zone 13 of the barrel 10. The threading 22 has a pitch equal to that of the thread of the barrel. However, the cross-section of the thread groove 22 is substantially V-shaped with a rounded apex 24 in order to prevent cracks originating from the bottom of the thread groove. The angle at which the flanks 25 of the groove converge may have any suitable size. I have found that an angle of 60° usually serves the purpose under consideration of the occurring forces, as to bearing resistance, shear, and wedging action. The depth 26 of the groove should be appreciably larger than that of groove 16 in the barrel. Particularly, if the female member of the connection, i. e. the cylinder head of the illustrated embodiment, is made of aluminum, it is advisable to make groove 22 approximately twice as deep as groove 16. The convolutions of groove 22 are spaced by lands 27 with rounded edges 28 similar to the lands 19, so that the lands of the head and the barrel are opposite each other when the parts are assembled as will be described hereinafter.

In the illustrated embodiment I made the thread pitch between 1/40 and 1/60 of the barrel diameter, the depth of the thread on the barrel approximately 1/4 of the pitch, and the depth of the thread in the head approximately 1/2 of the pitch.

The cylinder head and barrel are connected to each other by means of a wire coil 29 of a suitable material which has the required properties as to hardness, elasticity, ductility, anti-corrosiveness, friction, thermal conductivity and electrical potential as more fully described in my afore-mentioned Patents 2,150,876 and 2,152,681. I have found that a hard drawn phosphor bronze is well suited for the purpose although other materials may be used also with good results. The cross-section of the wire has an outer portion 30 of substantially triangular shape with sides converging at an angle of the same size as that of the thread groove of the cylinder head 11. The apex 32 is rounded off and slightly wider than the bottom 24 of the last mentioned groove so that the outer wire portion can bear against both flanks 25 of the thread groove simultaneously to exert a certain wedging action without contacting with apex 32 the groove bottom 24. The inner portion 33 of the wire is approximately segment-shaped. Its curvature has a radius slightly smaller than that of the segment-shaped groove 16 of the cylinder barrel 10. Where the sides 31 of the outer wire portion meet the arc of the inner portion 33 at 34, the material is rounded so as to avoid any corner formation. The wire coil is originally wound with a pitch equal to that of the threads 16 and 22 and with an inner diameter $D_3$ smaller than diameter $D_1$, mentioned in connection with the bottom of grooves 16. I have found that it is advisable though not necessary to wind the coil as much undersize as the wire will stand, and I determine this by experimenting with the coil diameter to see what diameter may be used without too much difficulty in assembling the inserts on the cylinder barrels. In a particular case, a coil diameter about 80% of that which it assumes when assembled in place has been found suitable. The trailing convolution 35 of the coil may be wound with a diameter slightly smaller than the main portion of the coil in correspondence with the difference in the depth of the thread groove portions 18 and 16. However, in most instances this will not be necessary and the coil may be wound throughout its entire length with the same diameter, because the difference in the depth of the thread grooves between the groove portions 18 and 19 will be very slight compared with the total expansion of the wire coil on assembly.

Now, it will be apparent that the wire coil 29 when screwed on the barrel 10 will bear with its convolutions against the bottom of the groove 16 and with its trailing convolution 35 against the bottom of the groove portion 18. Since the coil has to be expanded for this purpose, a certain pressure will be set up between the coil and the barrel owing to the elasticity of the coil material, whereby the coil is prevented from being easily slipped over the lands 27 under the action of axial forces during the assembling of the cylinder head. Owing to the difference in the radii of the segment-shaped cross-sections of the coil wire and the groove, it is insured that the wire safely rests on the base of the groove. The trailing convolutions 35 of the wire coil in engagement with the deeper groove convolution 18 facilitates the screwing on of the cylinder head 11.

In assembling the cylinder head, there is the tendency of the wire coil to be taken along owing to the wedge form of the wire and of the thread in the head 11. This can be avoided by increasing the adherence of the trailing convolution 35 to the barrel for instance by bonding, e. g. soldering it to the groove portion 18. If, then, the cylinder head is screwed on the wire coil, it will be first guided by the convolution 35 without, however, exercising thereupon any appreciable grip or frictional force owing to the slightly smaller size of this convolution. When the following convolutions engage the cylinder head groove, the pressure caused on the wire tends to wind the coil more tightly around the cylinder barrel, whereby the coil is held definitely in place, so that the parts may be brought into their relative position, shown in Fig. 1. However, this is true only if the radial forces occurring during the assembling are not very great. If these forces exceed a certain limit the wire coil will be so strongly wedged into the thread groove of the cylinder head after one or two turns that the solder joint between the barrel and convolution 35 will be broken and the wire coil displaced in respect to its groove in the barrel. Such an assembly would then be unsatisfactory since the wire coil would not be in all of the thread grooves. Hence, the invention so far described is useful only in connections in which no particular tight fit is required, as for instance in the connection of water or gas pipes without very great interior pressure, or in cases where the material of the male member is subject to a larger expansion than the female member under the conditions of operations. Such cases may prevail where both members are exposed to a raised temperature and the material of the male member has a higher coefficient of expansion than the female member, or where both members have equal coefficient of expansion, and relatively large amounts of heat are to be transmitted from the interior through the male member to the female member owing to the decrease of the temperature along the path of heat transmission.

In the case of a connection similar to that of the illustrated embodiment where the male member consists of steel and the female member of aluminum, that means where the coefficient of expansion of the female member is higher than that of the male member, and larger quantities of heat are to be transmitted from the inside to the outside, it is necessary to apply certain precautionary measures, in order to safeguard a tight fit under all working conditions. This is accomplished according to the invention in a manner illustrated by Figs. 6 and 7. These figures clearly show, in solid lines, the contours of a cross-section through the male member or barrel 10 with the thread grooves 16, lands 19 and rounded edges 20. The female member 11, is originally made according to the contour 40 shown in dashed lines, and the contour of the cross-section of the coil wire 29, in its original shape of Fig. 5, is entered in Fig. 6. As will be apparent from Fig. 6, the threaded hole in the cylinder head, or the lands 27' are originally made with an inner diameter $D_4$ smaller than the diameter $D_2$ which is the outer diameter of the barrel.

The amount the diameters $D_2$ and $D_4$ preferably differ from each other, can be found by calculation or experiment under considerations of the stresses to which the parts are subjected during the assembling as hereinafter described. In all other respects, particularly, as to the convergence of the sides of the thread groove in the cylinder head, the structure of Fig. 6 complies with the description hereinbefore, and the illustration of Fig. 3.

Now, the parts are assembled in the following manner: First, the wire coil 29 is screwed on the barrel 10 to engage the threading 16 until convolution 35 is positioned in the groove portion 18. Then, convolution 35 is bonded to 18 by soldering. Thereafter, the head 11 is heated until its diameter $D_4$ has increased to $D_5$ and become slightly larger than diameter $D_2$, and the so heated head is screwed home on the wire coil 29 which is attached to the barrel 10. This can be readily accomplished since the thread groove 22 will have expanded accordingly, as clearly shown by solid lines in Fig. 6. The slight variation in the pitch which will occur simultaneously can be easily balanced owing to the fact that on the one hand the threaded portion is relatively short, and on the other hand, there is a certain lateral freedom of the wire in the groove 16, as hereinbefore explained, which permits some tilting of the wire without much strain during the assembling. When, now, the head cools down, it shrinks until the lands 27' of Fig. 6 have taken the position 27 of Fig. 7 and are firmly pressed upon the lands 19. Simultaneously, the outer portion of the wire coil is wedged into the groove 22 and slightly deformed in its inner portion so as to reduce or even fill more or less completely the originally free spaces between the wire and the sides of groove 16 and the rounded edges of the lands 19 and 27. This final position is illustrated in Fig. 7.

The afore-mentioned shrinking operation is preferably done at a considerable higher temperature than that reached in service. In fact, I have found it practical to heat the cylinder heads up to a temperature of about 600° F. while the barrels with the thread portions may be chilled by kerosene in which dry ice has been placed until they are ready to be shrunk into the cylinder heads. This gives a sufficient margin in the temperatures, since in service operation the temperature around the threaded portion of the head rarely exceeds 350° F., with the temperature of the barrel at this point being generally about 30° higher than that of the head.

It will be apparent that the connection obtained as hereinbefore described offers, with respect particularly to tubular members of relatively large diameter, advantages similar to those of the connection according to my aforementioned Patents 2,150,876 and 2,152,681, with respect to bolt and boss connections or spark plugs in particular. In detail, if ever necessary, the head can be removed from the barrel without destroying the threading; all convolutions of the threading cooperate in taking up the forces occurring in operation; there is a very strong wedging action on both sides of the thread groove of the head, whereas, the maximum pressure in the thread groove of the barrel occurs at the bottom thereof, and the connection is far superior to all conventional screw connections from the viewpoint of thermal conductivity. In this respect, the conventional connections are especially poor inasmuch as they have only a very small number of thread convolutions of the connected members in a one-sided contact with each other. Contrary thereto, all the convolutions of the connection according to the invention are in intimate contact along almost their entire surface. In addition thereto, even the lands 19 and 27 engage each other firmly to contribute to the heat transmission. Although, the coefficient of expansion of the head 11 is greater than that of the barrel, there is no danger or only a minimized danger of gaps occurring between the lands owing to the heat to which the connection may be exposed from the interior, because on the one hand, the barrel will have a considerably higher temperature than the head, and, on the other hand, the barrel is under contraction forces owing to the shrinking operation during the assembling. These forces will have to be balanced by the heat transmitted from the interior during the operation of the machine of which the cylinder is a part, before the lands can start to separate from each other. Actual tests have shown that a cylinder provided with the connection according to my invention can be safely operated at a power 10% to 20% greater than a cylinder of similar dimensions in which barrel and head are connected in the usual manner. This result, I believe, is primarily due to the improved conditions of the heat transfer.

As stated hereinbefore, my invention is applicable not only to cylinder heads of the type described but also to many other devices, particularly such of tubular shape. For this reason, I do not wish to limit myself to structure, but what I claim is:

1. A shrunk connection of a steel barrel with an aluminum head of a cylinder of an internal combustion engine, comprising a substantially V-shaped thread groove with rounded apex interiorly of said cylinder head, a shallow substantially segment-shaped thread groove on said barrel, the upper end portion of said segment-shaped groove being deeper than the main portion thereof, a coil insert of a hard but ductile bronze wire, the cross-section of said coil wire having an outer portion substantially fitting snugly the sides of said V-shaped thread groove and an inner portion of a width slightly smaller than that of the segment-shaped groove, lands with rounded edges between the thread convolutions of said head, other lands with rounded edges between the thread convolutions of said barrel, the inner diameter of the lands of the thread of the head being originally smaller than the outer diameter of said other lands, said coil being screwed into the thread of said barrel and bonded with its trailing end portion to said deeper thread groove portion and being shrunk thereon, whereby said head while being expanded through heat being screwed on said coil, said lands of said head and said barrel are firmly pressed against each other, and the cross-section of the wire of the coil being originally so dimensioned as to be deformed to substantially fill the spaces between said barrel and said head after contraction of the latter owing to its shrinking.

2. A method of making a shrunk connection of a male tubular member and a female member, which comprises providing said male member with an exterior shallow thread groove with lands between the convolutions thereof, and said female member with an inner thread groove with lands between the convolutions thereof and of a pitch equal to that of said male member and of a depth larger than that of the male member, the diameter of the lands of said female member being smaller than that of the lands of the male member, coiling a hard and ductile wire with a cross-section similar to the combined cross-sections of both said thread grooves, and with an inner diameter smaller than that which defines the location of the bottom of the thread groove on the male member, screwing said coil into the thread groove of the male member whereby the outer diameter of the wire coil becomes wider than the corresponding diameter of the thread groove of the female member, bonding the trailing end portion of the coil to the bottom of the thread groove of the male member, causing a difference of temperature between said female member and said male member with said coil thereon until the diameter of the lands of the female member is slightly larger than that of the lands of the male member, screwing the female member while said difference in temperature prevails on said wire coil, and permitting said members to attain substantially equal temperature, whereby said lands of said female member will be firmly pressed upon those of the male member and the coil wire will be deformed so as to fill substantially the spaces between the female and the male member.

3. A cylinder for an internal combustion engine comprising a steel barrel, a light metal head, and a springy wire coil of a hard but ductile material, said barrel having an external screw threading of a rounded cross-section of the thread groove and lands between the thread groove convolutions, said cylinder head having an internal threading of a groove cross-section with converging sides and rounded bottom and lands in registry with those of the barrel, said wire coil being under contractile tension and in part embedded in said thread groove of said barrel so as to project therefrom and to engage the threading of said head, and said cylinder head being shrunk on said barrel and the coil portion projecting from the thread groove of the barrel, whereby the lands of said head and barrel are firmly pressed upon each other and the ductile coil material is so deformed as to substantially fill the thread grooves of the barrel and the head.

4. In a threaded connection of the type in which an exterior member is provided with an internal helical thread groove which is substantially V-shaped in cross-section and an internal member is provided on its outer surface with a helical thread groove which is segment-shaped in cross-section and has the same pitch as the thread groove on the exterior member and the members are joined by a springy wire coil which is substantially triangular in cross-section having a segment-shaped base which is received in the thread groove in the inner member and converging side faces defining an outer part received within the thread groove in the outer member, the improvement which consists in preforming the coil with an inner diameter substantially less than the least diameter of the thread groove in the inner member and assembling such coil on the inner member before connecting the outer member thereto.

5. The improvement according to claim 4, in which in addition the thread groove on the inner member is so formed that the end thereof which is first met by the outer member when being screwed onto the inner member is made deeper than the rest of such thread groove.

6. The improvement according to claim 4, in which in addition the thread groove on the inner member is so formed that the end thereof which is first met by the outer member when being screwed onto the inner member is made deeper than the rest of such thread groove and the end of the coil which is received in such deeper part is attached therein by bonding to the inner member.

HAROLD CAMINEZ.